Figure 1:
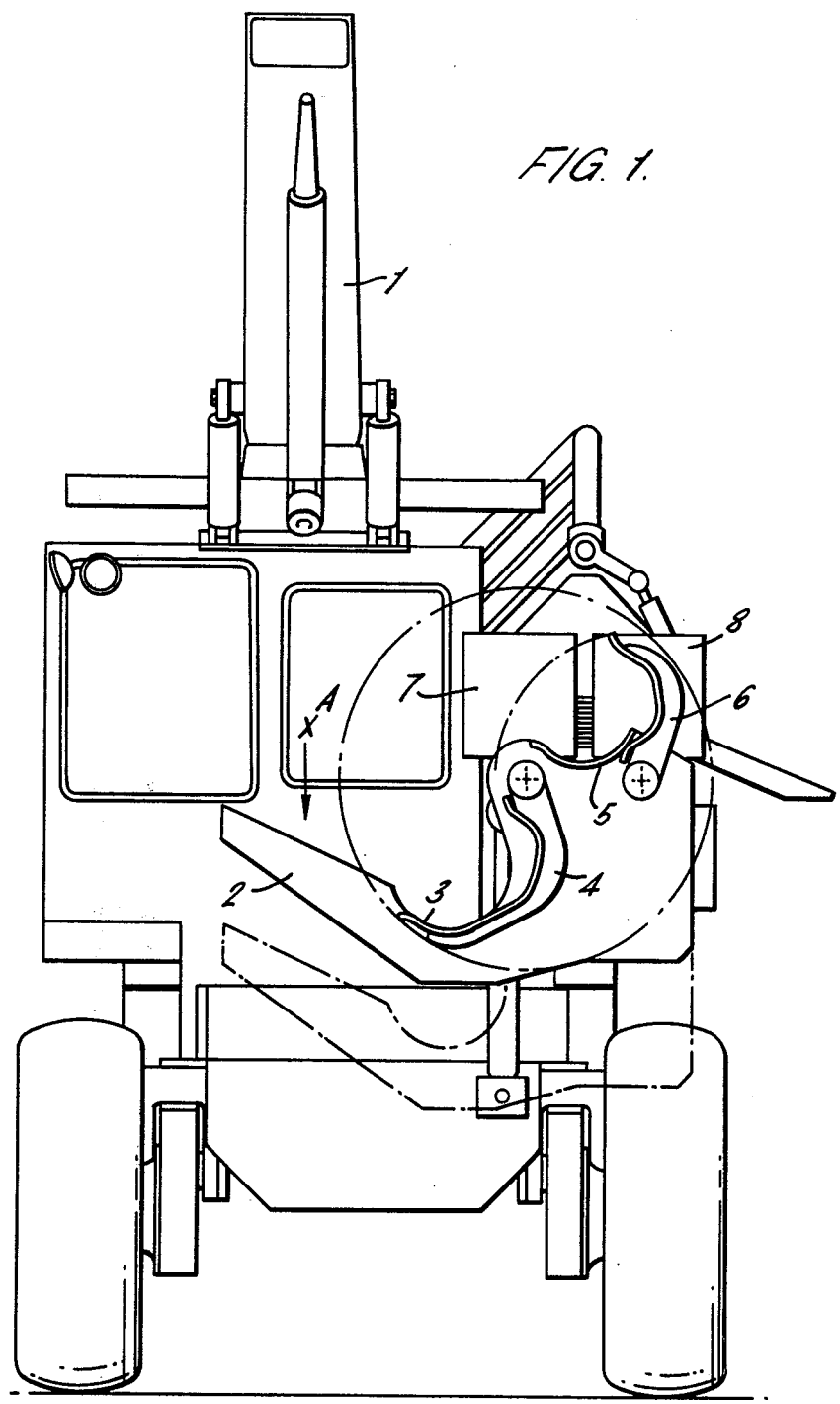

United States Patent [19]

Moisander

[11] 4,010,782
[45] Mar. 8, 1977

[54] METHOD AND DEVICE FOR FEEDING TREES IN TREE HARVESTING APPARATUS

[75] Inventor: Jukka Moisander, Tampere, Finland
[73] Assignee: Rauma-Repola Oy., Finland
[22] Filed: Jan. 5, 1976
[21] Appl. No.: 646,552

[30] Foreign Application Priority Data
Jan. 16, 1975 Finland .............................. 750107

[52] U.S. Cl. .......................... 144/309 AC; 144/2 Z; 144/34 B; 214/1 BD
[51] Int. Cl.² ..................................... A01G 23/08
[58] Field of Search ................ 144/2 Z, 3 D, 34 R, 144/34 E, 309 DC, 34 B, 246 R, 246 F, 246 A, 246 C, 246 D; 214/1 BD, 130 R

[56] References Cited
UNITED STATES PATENTS

| | | | |
|---|---|---|---|
| 3,028,020 | 4/1962 | Peras ............................... | 214/1 BD |
| 3,269,437 | 8/1966 | Busch ............................ | 144/2 Z X |
| 3,833,034 | 9/1974 | Menzel et al. ................... | 44/2 Z X |

Primary Examiner—Othell M. Simpson
Assistant Examiner—W. D. Bray
Attorney, Agent, or Firm—Burns, Doane, Swecker & Mathis

[57] ABSTRACT

A method and apparatus which permit a tree fetching member to continuously feed trees to harvesting apparatus without waiting for a previously deposited tree to be handled is characterized by having a single member function both as a means for lifting a tree to the handling line from a temporary holding location in the apparatus, below the handling line, and also as a lopping or delimbing knife. This lopping knife, which is rotatable about a horizontal, longitudinal axis, raises one tree at a time over its turning axis to the handling line. Then, acting as a feeding member, it takes part in the lopping operation in conjunction with other lopping knives which are intended for lopping only. The rotatable lopping knife is the sole means for raising a tree to the handling line.

3 Claims, 3 Drawing Figures

METHOD AND DEVICE FOR FEEDING TREES IN TREE HARVESTING APPARATUS

In tree harvesting apparatuses, such as multifunctional apparatuses which fell, lop, cut and sort trees handled by them, and in processors which handle felled trees, the feeding of trees to a handling line is one operation of the process. This handling line usually consists of one or several lopping or delimbing knives, one or several horizontal, vertical or slanted pulling rolls and trunk cutting means, listed in the order a tree passes through them.

The handling line can be accomplished also otherwise but the above probably are the most common arrangements at the moment. In the apparatuses presently known, the feeding takes place from a tree fetching member either directly to the handling line or into some sort of an intermediate station from which the tree is dropped or otherwise moved to the handling line.

The greatest drawback in feeding directly to the handling line is the fact that the tree fetching member cannot leave a tree until the handling line has handled the previous tree. This may cause unnecessary waiting times both for the tree fetching member and the handling line. A further drawback is the fact that the larger end of the trunk has to be lifted fairly high. Particularly because of horizontal pulling rolls, so called intermediate stations require the larger end of the trunk to be lifted very high which makes the working of the tree fetching member more difficult and slower. Further, the intermediate station usually requires own separate working devices.

In this invention, preferably one lopping knife acts as a feeding member so that both the feeding and part of the lopping is carried out by one working device.

The method according to this invention is mainly characterized in that the feeding of trees to the handling line is carried out so that one or several trees at a time are fetched into a space formed for feeding in the apparatus, or onto a beam or like inclined in the direction of the said space, whereafter one or several lifting members or lopping knives, turnable around a substantially horizontal axis, lifts around its turning axis one tree at a time from the waiting space to the handling line.

The invention also relates to a device for applying the said method. By means of the arrangement of this invention, it is possible to raise the larger end of a tree to the handling line from a relatively lower position so that the tree fetching member can correspondingly leave the larger end lower than in the conventional feeding systems. The invention enables the next tree to be left waiting even if the handling of the previous tree on the line is not finished. In this way, the tree fetching member need not wait until a previous tree has been handled and thus is free to operate continuously. As a result, variations in the respective speeds of a handling line and the fetching member can be levelled off, facilitating greter synchronization between the two. Further, to a system according to the invention it is easy to add a waiting beam which rations one tree at a time to the feeding member. This is necessary when the apparatus has a tree fetching member which can fetch more than one tree at a time for handling.

Figure 2:
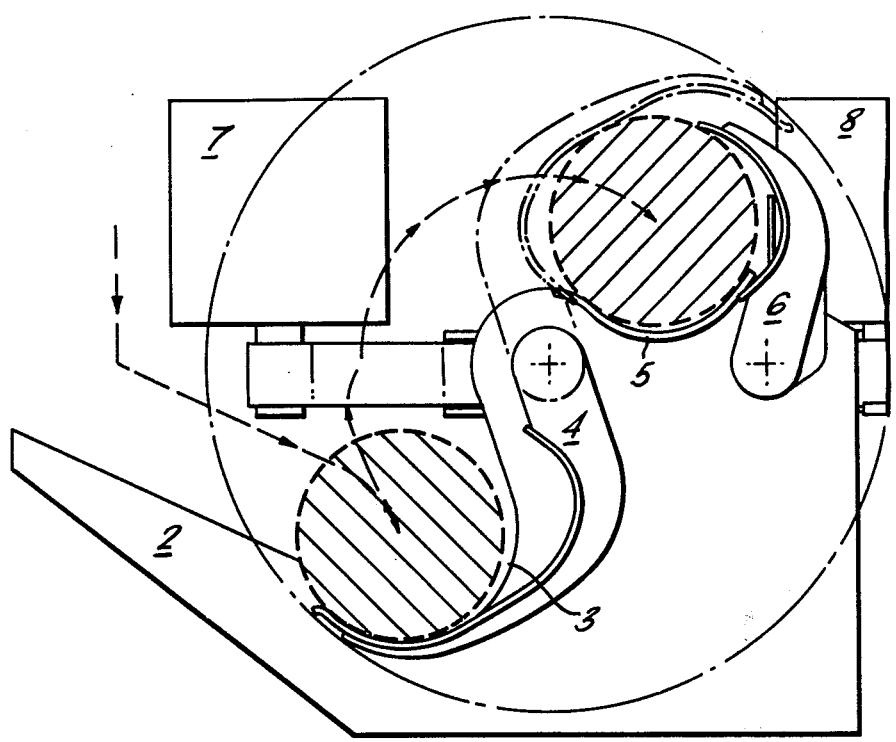
Figure 3:
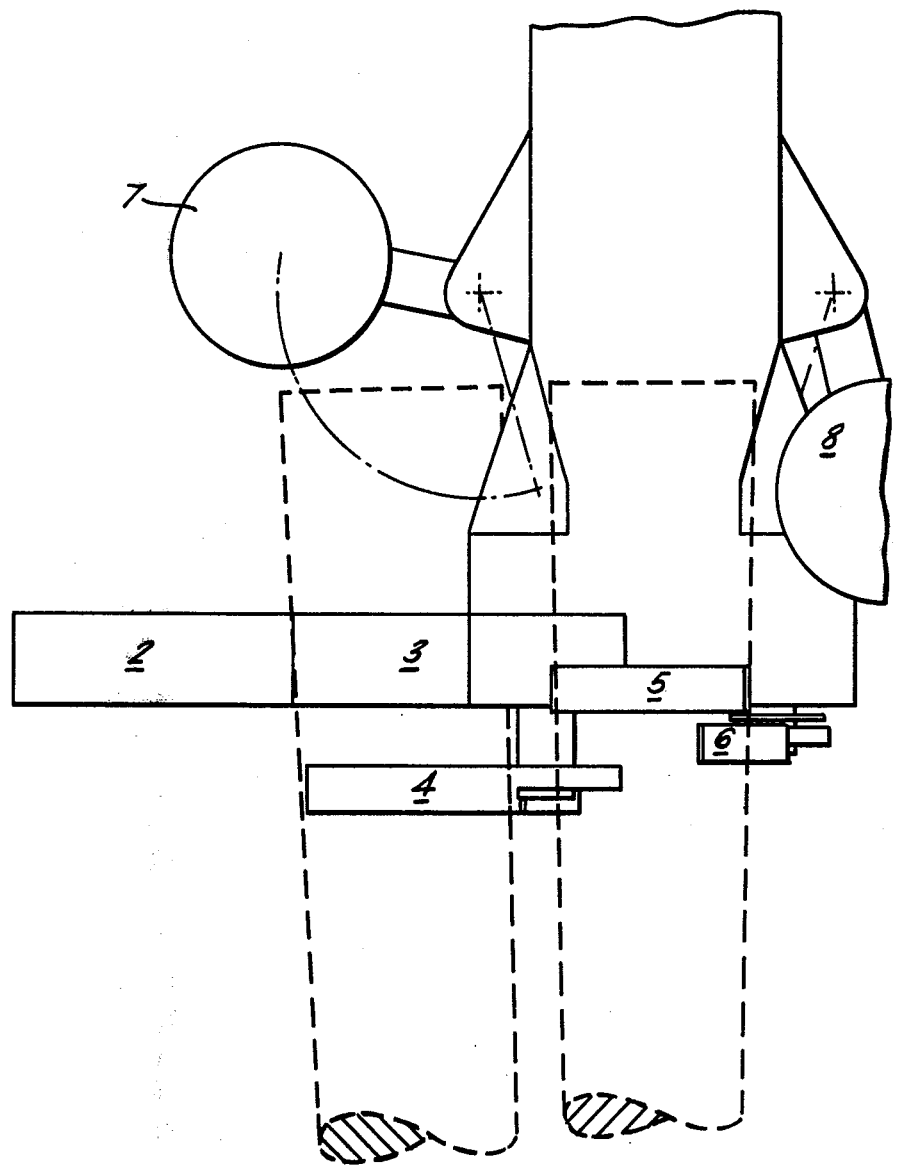

The structure and operating description of a feeding device embodiment according to the invention are illustrated in the following with reference to the accompanying drawings in which FIG. 1 shows a feeding device according to the invention arranged in a tree harvesting appartus, seen from the incoming or input direction of trees, FIG. 2 shows a detail of the said feeding device, seen from the same direction, FIG. 3 shows a top view the said feeding device.

An articulated boom 1 acts as a tree fetching member in the tree harvesting apparatus of FIG. 1. The boom brings the larger end of the tree approximately to point A while the tree is substantially in the direction of the centre line of the apparatus. The articulated boom then lets the larger end fall onto a beam 2 from which the tree rolls or slides into a shaped space 3 in the beam 2 from where a lopping knife 4 acting as a feeding member lifts the larger end of the tree to the centre line of the handling line, onto a fixed lopping knife 5 which is lower with respect to lopping knife 6, as can be seen from FIGS. 1 and 2.

FIG. 2 shows the motion path of the centre point of the larger end of the tree, after the larger end has been released from the grip of the articulated boom.

When the tree has been brought onto the lower lopping knife 5, a lopping knife 6 and pulling rolls 7 and 8 are closed together with the lopping knife 4. The tree is then handled while the pulling rolls 7 and 8 pull it through a ring formed by the lopping knives 4, 5 and 6. In the meantime, the articulated boom 1 has possibly already brought the next tree which has been left waiting in the space 3 so that the articulated boom 1 has been able to start fetching the next tree without an interruption. When the handling of the tree on the line has been finished, the lopping knife 6 and the pulling rolls 7 and 8 open to their extreme positions but the lopping knife 4 continues its clockwise rotating movement and so it comes below the tree in the space 3 and lifts the tree without interruption up to the handling line where the handling may start immediately. If the articulated boom 1 has not had time to bring a new tree, the lopping knife 4 will stay waiting below the space 3 until a new tree comes to the space.

In the case of the embodiment shown, the vertical pulling roll 7 must always give way and swing outward from the handling line (FIG. 3) when the lopping knife 4 lifts the larger or butt end of the tree to the handling line. The giving of way can also take place to some other direction. In apparatus with horizontally mounted pulling rolls, the rolls need not necessarily give way more than their normal opening. When the rolls are in some other position than stated above, the giving of way depends on the particular arrangement in the apparatus.

The shaping of the space 3 (FIG. 2) is such that the larger end of the tree does not escape from the handling line, and the lopping knife 4 gets a porper grip on the end for lifting. The larger end can also be held in position by other means, for instance mechanically, by means of a spring tensioned lever or levers, spikes or like.

The slanting of the beam 2 (FIG. 2) causes the larger end of the tree to slide into the space 3. This can also be accomplished for instance mechanically by spring force or by arranging the above mentioned rationing beam in the place of the beam 2.

In order to make the circular feeding movement of the lopping knife 4 (FIG. 2) possible, the lopping knife 4 has to be farthest out and no other working device can stand in its way. The feeding can be arranged also by a seesaw motion or by means of a completely separate member, the working of which corresponds to the feeding movement of the lopping knife 4.

I claim:

1. A method for feeding felled trees to and handling said trees in the handling line of a multifunctional tree harvesting apparatus, said method comprising continuously delivering felled trees to a multifunctional tree harvesting apparatus having a receiving and holding zone therein or thereon and a handling line elevated with respect to said receiving and holding zone; feeding a first tree to the handling line by engaging said first tree while in the receiving and holding zone by a rotatable first lopping knife rotating about a horizontal axis intermediate said receiving and holding zone and said handling line, rotating said first lopping knife until said engaged first tree has been raised above said horizontal axis of rotation to said handling line; delimbing said first tree by pulling said first tree along the handling line to cause engagement with the cutting edge of said rotatable first lopping knife and to cause simultaneous engagement with the cutting edges of non-rotatable, additional lopping knives adjacent the handling line; engaging a second tree in the receiving and holding zone by said rotating lopping knife after said first tree has been delimbed; and raising said second tree to the handling line, the cycle of steps being continued while additional felled trees are delivered to the receiving and holding zone.

2. A method according to claim 1 wherein after the first tree has been delimbed, the rotating lopping knife continues its rotating movement around its axis in the feeding direction to engage the second tree and to raise said second tree over said axis from the receiving and holding zone to the handling line.

3. In a multifunctional tree-harvesting apparatus having tree-felling means, means for delivering felled trees to the input end of the apparatus, and a handling line for felled trees including tree-pulling means and lopping knives:

a. a tree supporting member mounted on a lower portion of the input end of the apparatus for receiving and supporting the butt end of a felled tree, said support member forming a holding and storing means for said felled tree awaiting handling;

b. an upwardly-inclined, sideward, beam-like extension on said tree supporting member for receiving and supporting additional felled trees and for permitting said additional felled trees to successively slide onto said tree supporting member;

c. first delimbing means rigidly mounted at the input end of the apparatus along the handling line, said first delimbing means having a cutting edge and a configuration for encircling a portion of the circumference of the trunk of a tree in the handling line;

d. second delimbing means adjacent said first delimbing means, said second delimbing means having cutting edges and being pivotably mounted for reciprocating movement through an arc sufficient to contact said trunk and so placed as to encircle a portion of the circumference of the trunk of said tree in the handling line adjacent the portion encircled by said first delimbing means; and e. third delimbing means having cutting edges and a scoop-like configuration mounted at the input end of the apparatus for unobstructed, continuous rotation through a full circle about a substantially horizontal axis extending in the longitudinal direction of the apparatus, said axis of rotation being disposed below the handling line and above the tree supporting member, the length of said third delimbing means being sufficient to extend beneath the butt end of a felled tree on said tree-supporting member, whereby, upon rotation, said third delimbing means raises said butt end of the tree to feed it into the pulling means in the handling line while encircling a third portion of the circumference of the trunk for delimbing, said third delimbing means, upon completion of delimbing, continuing its rotation to engage a second tree on the three supporting member to raise said second tree to the handling line, said continuously rotatable third delimbing means constituting the sole means for raising a felled tree from the tree supporting member to feed said tree to the handling line.

* * * * *